Feb. 18, 1930.  W. W. FULLER  1,747,768
VEHICLE STEERING MECHANISM
Filed May 23, 1927   2 Sheets-Sheet 1
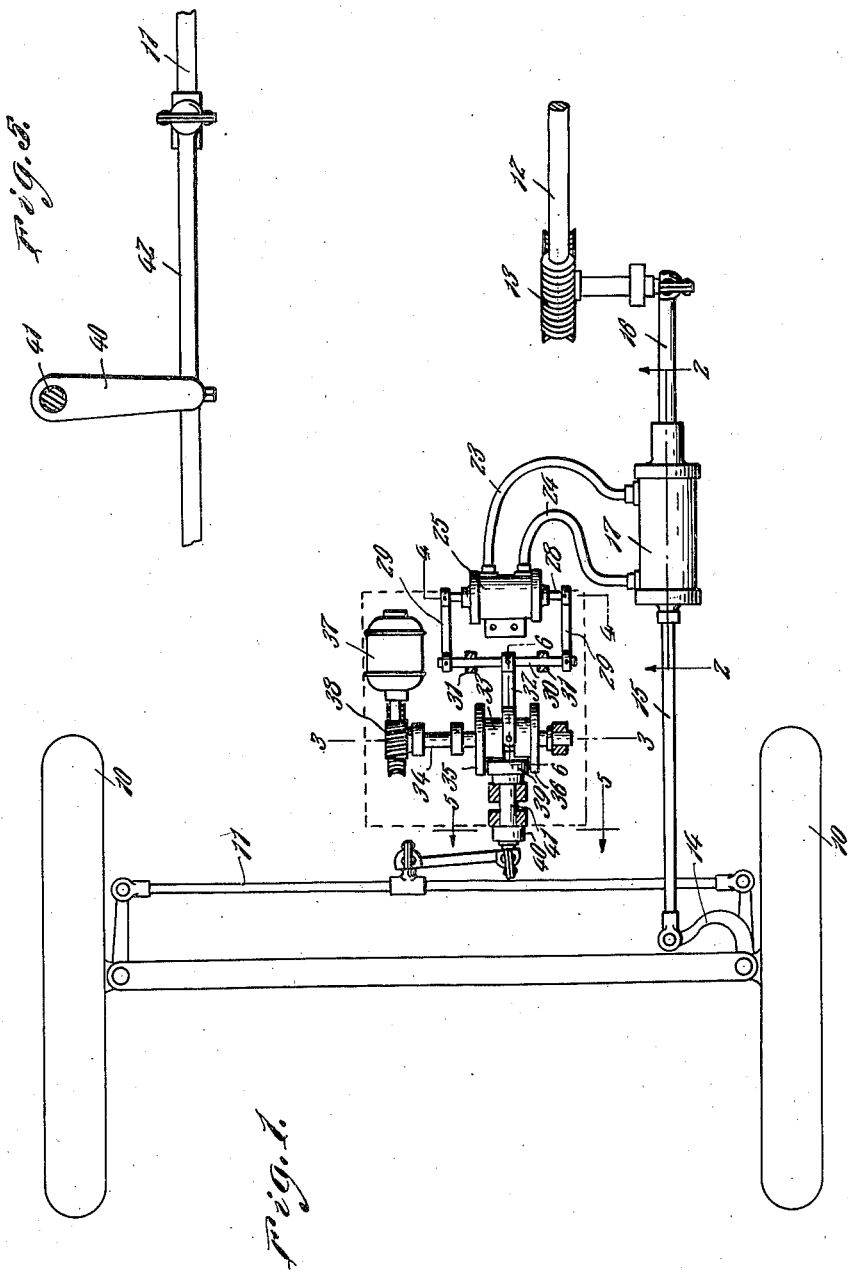

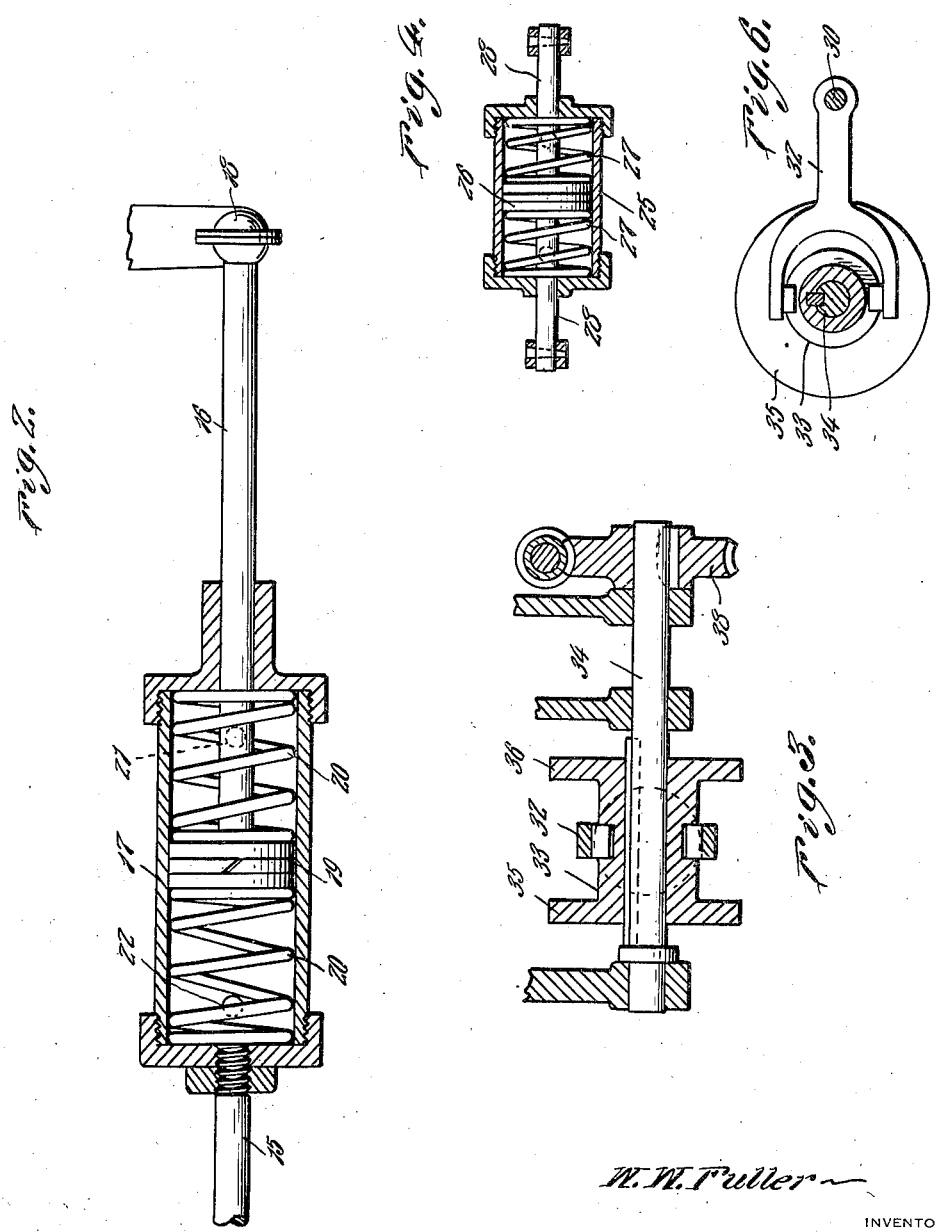

Patented Feb. 18, 1930

1,747,768

UNITED STATES PATENT OFFICE

WILLIAM W. FULLER, OF SAVANNAH, GEORGIA

VEHICLE STEERING MECHANISM

Application filed May 23, 1927. Serial No. 193,630.

It is the purpose of this invention to provide a combined power and hand controlled means for the steering mechanism of a motor operated vehicle, so that the latter may be safely and more easily handled, the power means in no way interfering with the hand controlled means, but materially assisting the latter for the purposes stated.

In carrying out the invention I contemplate the use of a hydraulic cylinder pressure for controlling the operation of a power actuated clutch, arranged to apply the power to the steering gear of the machine, the power applied being directly in proportion or any multiple thereof, and at the same time slightly in advance of the hand controlled power, thus accomplishing the desired result, namely a power control, which in turn is controlled by the hand, thus making the steering or guiding of the machine more safe and satisfactory.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a plan view showing one embodiment of the invention.

Figure 2 is a sectional view on line 2—2 of Figure 1.

Figure 3 is a sectional view on line 3—3 of Figure 1.

Figure 4 is a sectional view on line 4—4 of Figure 1.

Figure 5 is a sectional view on line 5—5 of Figure 1.

Figure 6 is a sectional view on line 6—6 of Figure 1.

Referring to the drawings in detail 10 represents the front wheels of a motor operated vehicle which are connected by the tie rod 11 forming part of the steering mechanism of ordinary well known construction. The hand controlled shaft of the steering mechanism is indicated at 12 and is operatively associated by the usual worm gear 13 with the rod that is directly connected with the arm 14 of the steering knuckle.

In accordance with the present invention this last mentioned rod is made in sections indicated at 15 and 16 respectively, the sections being operatively associated with a hydraulic cylinder 17 as illustrated in Figure 1. The section 15 of the rod is connected with the arm 14 above mentioned and has one end threaded to the adjacent end of the cylinder 17. The other section 16 of the rod is connected by a ball and socket joint 18 with the hand controlled shaft 12 in the manner illustrated in the drawing. The section 16 slides within the cylinder 17 and is provided with a piston 19 normally arranged centrally of the cylinder as illustrated in Figure 2. Coil springs 20 are arranged at the opposite sides of the piston 19, and the cylinder 17 is adapted to contain oil or other fluid. The cylinder 17 is provided with outlet ports 21 and 22 respectively, leading from which are flexible pipes or hose 23 and 24 respectively, the latter establishing communication between the cylinder 17 and a cylinder 25.

As above stated the hydraulic cylinder pressure is used to control the operation of a motor actuated clutch, and the cylinder 25 just referred to is employed in this connection. Arranged to reciprocate within the cylinder 25 is a piston 26 normally located centrally of the cylinder and located between a pair of coil springs 27. Piston rods 28 slide through the ends of the cylinder 25 and are connected with the parallel members 29 of a frame, which also includes a cross member 30 mounted to slide in suitable guides 31. Carried by the cross member 30 is a yoke 32 connected with a clutch collar 33 in the ordinary well known manner. The collar 33 is mounted for rotation with and upon a power operated shaft 34, and is provided with spaced friction disks 35 and 36 respectively. It might here be stated that the shaft 34 may be rotated by any suitable means without departing from the inventive idea. In other words the shaft may receive its power from the motor of a vehicle in any suitable manner, or use may be made of an electric motor 37 illustrated in Figure 1. In that event the shaft 34 is provided with a gear 38 meshing with the shaft of the motor 37.

Arranged between the friction disks 35 and 36, and normally spaced therefrom is a friction disk 39 carried by the shaft 40 arranged at a right angle to the shaft 34 and mounted in suitable bearings 41. The shaft 41 is connected with an arm 42, the latter in turn being connected with the tie rod 11 in any suitable manner. Consequently when the clutch is operated to rotate the shaft 41 in either one or the other direction, the tie rod 11 is also operated to turn the front wheels in the desired direction.

In practice, when the hand controlled shaft 12 is turned in one direction for the purpose of steering the machine, by means of the usual steering wheel (not shown), movement is imparted to the rod section 16 independently of the rod section 15. Consequently the piston 19 is moved within the cylinder 17, and the oil or other fluid within the cylinder 17 and at one side of the piston is forced through one of the flexible pipes into one end of the cylinder 25, whereupon the oil or fluid in the other end of the cylinder 25 is forced through one of the flexible pipes into the end of the cylinder 17 from which the piston 19 is moving. This hydraulic pressure therefore operates the piston 26 of the cylinder 25 in one direction, moving with it the cross member 30 of the frame connected with the piston rods 28. As the clutch operating yoke 32 is carried by this cross member 30, the clutch is shifted longitudinally of the shaft 34 bringing one of the friction disks thereof into engagement with the friction disk 39. The shaft 40 is then rotated in a particular direction to correspondingly turn the front wheels of the vehicle. Of course when the hand controlled shaft 12 is turned in an opposite direction, the operation of the piston in the cylinder 17, and the piston in the cylinder 25 is just reversed to that above described, thereby turning the front wheels in an opposite direction.

This hydraulic cylinder pressure manifestly controls the operation of the motor actuated clutch 33, and consequently utilizes the power of the shaft 34 to initially operate the steering mechanism of the machine. In other words the power from the shaft 34 is applied to the steering mechanism slightly in advance of the hand controlled power, because as the hand controlled shaft 12 continues to rotate through the medium of the steering wheel, the hand controlled power is also applied to the steering mechanism for the purpose intended. Obviously, the power from the shaft 34 being initially applied to the steering mechanism, materially overcomes the friction of the front wheels with the ground, so that as the steering wheel is being turned to guide the vehicle, the heretofore manual effort required to overcome this friction is eliminated. Inasmuch as the power from the shaft 34 utilized to control the clutch, is in turn controlled by the steering wheel of the vehicle, the invention not only provides a means which materially facilitates steering of the vehicle, minimizing the usual effort required, but also produces a very safe and more satisfactory control.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a vehicle steering mechanism, a lever connected to operate the steering mechanism, a power operated reversible clutch for operating said member and including a reciprocating frame, a fluid containing cylinder, a piston operating in said cylinder and having rods slidable through the ends thereof to operate said frame, hand operated means operatively connected to the steering mechanism and including a hydraulic cylinder and a piston operating therein, connections from the last mentioned cylinder to the first mentioned cylinder for transmitting the movement of the last mentioned piston to the first mentioned piston and thus operating the power mechanism.

2. In a vehicle steering mechanism, a power operated clutch including a reciprocating frame, a fluid containing cylinder, a piston operating in said cylinder and having rods slidable through the ends thereof and connected with said frame to operate the latter, hand operated means including a fluid containing cylinder, inlet and outlet pipes establishing communication between the respective cylinders, and a piston operating in the second mentioned cylinder, whereby the hand operated means control the movements of the pistons in the respective cylinders.

3. In a vehicle steering mechanism, a power operated clutch including a reciprocating frame, a fluid containing cylinder, a piston operating in said cylinder and having rods slidable through the ends thereof to operate said frame, hand operated means including a second fluid containing cylinder, a sectional shaft, one of said sections slidable within the second mentioned cylinder, a piston associated with said sections, springs arranged at the opposite sides of the last mentioned piston, and inlet and outlet pipes establishing communication between the respective cylinders, whereby the hand operated means control the movements of said frame.

In testimony whereof I affix my signature.

WILLIAM W. FULLER.